(12) United States Patent
Gazelle

(10) Patent No.: US 11,838,095 B2
(45) Date of Patent: Dec. 5, 2023

(54) SATELLITE DATA COMMUNICATION SYSTEM AND METHOD

(71) Applicant: SATIXFY ISRAEL LTD., Rehovot (IL)

(72) Inventor: David Gazelle, Ein-Sarid (IL)

(73) Assignee: SATIXFY ISRAEL LTD., Rehovot (IL)

( * ) Notice: Subject to any disclaimer, the term of this patent is extended or adjusted under 35 U.S.C. 154(b) by 225 days.

(21) Appl. No.: 17/234,326

(22) Filed: Apr. 19, 2021

(65) Prior Publication Data

US 2021/0314057 A1 Oct. 7, 2021

Related U.S. Application Data

(63) Continuation-in-part of application No. PCT/IL2019/051098, filed on Oct. 7, 2019.
(Continued)

(51) Int. Cl.
*H04B 7/185* (2006.01)
*H04B 7/19* (2006.01)
(Continued)

(52) U.S. Cl.
CPC ....... *H04B 7/1851* (2013.01); *H04B 7/18528* (2013.01); *H04B 7/19* (2013.01); *H04W 72/0453* (2013.01); *G16Y 10/75* (2020.01)

(58) Field of Classification Search
CPC .... H04B 7/1851; H04B 7/18528; H04B 7/19; H04B 7/216; H04B 2201/70702;
(Continued)

(56) References Cited

U.S. PATENT DOCUMENTS 6,072,770 A 6/2000 Ho et al.
7,289,460 B1 * 10/2007 Thacker ............. H04B 7/18543
370/320
(Continued)

FOREIGN PATENT DOCUMENTS

EP 3232583 A1 10/2017
EP 0863622 9/2018

OTHER PUBLICATIONS

Niemela, p. 2018. "Narrowband LTE in Machine to Machine Satellite Communication", Thesis, Alto University, School of Electrical Engineering, Finland.
(Continued)

*Primary Examiner* — Dady Chery
(74) *Attorney, Agent, or Firm* — Browdy and Neimark, PLLC

(57) ABSTRACT

A satellite communication system and method are presented for operation in one or more frequency bands to simultaneously relay data signals between a plurality of remote terminals and one or more ground stations (gateways) in both return and forward links. This allows the remote terminal to be of a few centimeters in size. The satellite communication system comprises a processor configured and operable to receive from each of the remote terminals an uplink return signal in the form of a plurality of terminal return signals spread over a predetermined first frequency allocation in said one or more frequency bands according to a predetermined spread function, de-spread the received plurality of terminal return signals, and generate a downlink return signal, corresponding to at least some of the received plurality of spread terminal return signals and having a predetermined second frequency allocation, to be sent to one of the ground stations.

19 Claims, 2 Drawing Sheets

Related U.S. Application Data

(60) Provisional application No. 62/746,729, filed on Oct. 17, 2018.

(51) Int. Cl.
*H04W 72/0453* (2023.01)
*G16Y 10/75* (2020.01)

(58) Field of Classification Search
CPC ......... H04W 72/0453; H04W 56/0035; H04W 56/0045; H04W 92/10; G16Y 10/75
See application file for complete search history.

(56) References Cited

U.S. PATENT DOCUMENTS

| | | | |
|---|---|---|---|
| 2004/0114556 A1* | 6/2004 | Miller | H04W 56/0045 370/335 |
| 2005/0118947 A1 | 6/2005 | Ames et al. | |
| 2009/0264120 A1 | 10/2009 | Karabinis | |
| 2015/0304021 A1 | 10/2015 | Rudrapatna | |

OTHER PUBLICATIONS

3rd Generation partnership project, Mobile competence centre, vol. TSG RAN No. 4.0, pp. 1-62 (2018).

* cited by examiner

SATELLITE DATA COMMUNICATION SYSTEM AND METHOD

CROSS-REFERENCE TO RELATED APPLICATIONS

This application is a continuation-in-part of PCT application PCT/IL2019/051098 filed on Oct. 7, 2019, which claims priority from U.S. provisional application 62/746,729 filed on Oct. 17, 2018, both of which are incorporated by reference herein in their entirety.

TECHNOLOGICAL FIELD

The invention is in the field of satellite-based communication techniques, and relates to a satellite data communication system and method, particularly useful for satellite-based internet of things (IoT) services.

BACKGROUND

IoT is associated with any device connected to the Internet, such as a simple sensor, a smartphone, a wearable device, an industrial machine, etc. The service data rate may vary from hundreds of bits per second to 1 Mbps depending on the technology and application.

As of today, the leading terrestrial wireless network technologies used can be categorized to Low Power Wide Area Networks (LPWAN) and cellular networks. The leading LPWAN technologies are LoRa and SigFox and the cellular ones are LTE-M and NB-IoT. All these technologies offer a low service cost; however, they do not have global coverage and infrastructure, like a cellular network, must be installed to support these services.

Consequently, for global coverage IoT connectivity, space-based solutions are better suited to handle the widespread connectivity challenge. Space-based Internet relies primarily on three components: a satellite, typically in geostationary orbit (GEO), a number of ground stations, known as gateways, that relay Internet data to and from the satellite, and a remote terminal at the subscriber's location, which is a small antenna with a transceiver.

Space based solutions have been the answer for extending communication services into uncovered areas for decades. With recent evolution of terrestrial IoT systems, new technologies should be developed for the space industry to support the increasing number of devices that have to be connected to the internet. These technologies would have to support global coverage, low bit rates and scalable architectures with a sustainable business aggressive pricing schemes.

Currently, narrow band satellite services providers operate at low frequencies, from VHF through L band and S band. Low frequencies are more susceptible to interference as there is a considerable amount of unintentional radiation in these bands due to Man-made noise. It is also not practical to use directional antennas at these frequencies at the remote terminal as the size of the antennas will have to be relatively big. On the other hand, desirably small antennas have poor transmission directionality and consequently may cause interference in the form of noise to other nearby satellites. Due to the above-mentioned deficiencies of operation in low frequencies, the capacity is limited.

GENERAL DESCRIPTION

The present invention provides a novel approach for satellite-based communication architecture, suitable for IoT services, which enables low bit rate services to be supported over high frequency bands. Operating over high frequency bands enables, inter alia, low-cost services and devices. Operation with wide bandwidth will allow for servicing a considerably higher capacity of terminals required for global coverage.

The technique of the invention enables use of very small antennas at the remote terminals to establish a link with the satellite, while, at the same time, interference to adjacent satellites is eliminated, or at least significantly reduced. Indeed, use of small antennas (e.g. at the terminal side) yields relatively wide-beam operation of the antenna, e g angularly wide transmission beams. This may generally result with the beam interaction (hereinafter referred to as "interference") with neighboring satellites which are not intended to communicate with that terminal (i.e., are "unauthorized" satellites). In turn, such interferences interrupt operation of the neighboring/adjacent unauthorized satellites.

The invention, in one of its aspects, solves such problem by utilizing frequency/spectral spreading of the signal originating at the terminal and addressed to an authorized satellite. Moreover, such spreading is preferably a high factor spreading over a broad bandwidth. Spreading of the signal can be achieved through the use of any known suitable spectrum-spread techniques.

Accordingly, the required beam power (intensity) for transmitting data piece from the terminal is divided over the broad spectral range according to a predetermined spreading function. As a result, each frequency slot/component within the broad spectral range of the spread beam is transmitted with much smaller power, as compared to the situation in which the original beam is transmitted in the conventional way over a narrow spectral band, and therefore its interaction with the neighboring satellites is practically negligible. Moreover, the interaction of the entire spread-beam with any unauthorized satellite (which is not configured for de-spreading the spread-beam according to the predetermined spreading function) is also negligible, thus practically eliminating interference with unauthorized satellites. In other words, the spectral density of the signal from the terminal to other satellite is much below the thermal noise density allowable by regulation, and thus undetectable by any unauthorized satellite user.

However, while spreading of the signal between the terminal and the satellite overcomes the interference issue, mirroring (band-piping) of the spread signal by the satellite to a ground station (gateway) would require that the ground station can handle the broad bandwidth (BW) at the downlink return channel from the satellite to the gateway (GW). Such gateway is either too expensive or a plurality of gateways are needed which also means very high costs.

It should be noted that in the description below the term "relay" with respect to data or data signal actually includes any known suitable technique used by a satellite for receiving uplink and retransmitting corresponding downlink signals. This covers mirroring and/or band piping and/or regeneration, etc., with or without frequency conversion, with or without data re-encoding, etc.

The novel technique of the invention provides a novel satellite communication system, which has an on-board processor at the satellite that, upon receiving such uplink returned signal from a terminal having a broad spectral range spread utilizes the predetermined spreading function to de-spread the signal (arriving from the terminal) and convert the signal (e.g. apply power and spectral conversion; and/or regeneration of the signal, such as re-encoding of data) into a narrow band signal, which is then downlinked to the gateway. This enables considerable reduction of the used spectrum in the communication between the satellite and the gateway (and also reducing the costs considerably), as compared to communicating (e.g. mirroring) using the spread signals. It should be understood that this also eliminates a need of a plurality of gateways.

It should also be noted that the technique of the invention allows the satellite to communicate concurrently with multiple terminals to receive multiple spread beams/signals therefrom, respectively (the multiple spread beams can be distinguished by such parameters as their arrival direction and/or polarization, as well as their spreading function/factor). When de-spreading the multiple uplink spread beams from the terminals, the satellite communication system is configured to generate a downlink return beam/signal carrying information of all the multiple uplink spread beams, while the bandwidth of the downlink return beam to the gateway is substantially smaller than the sum of bandwidths of the uplink spread beams. For example, each de-spread signal corresponding to the spread beam from the terminal can be arranged to occupy a narrow bandwidth slot in the generated downlink return beam to the gateway.

Accordingly, the present invention achieves global space-based internet services, by enabling simultaneous signal transmission in the return channel from hundreds of remote terminals at a time, while utilizing as low as possible number of satellites and/or ground stations for the gateway. According to the invention, three geostationary satellites are enough to provide global coverage.

The invention also enables high efficiency with regard to energy (power) consumption both at the remote terminal side as well as at the satellite side.

In addition, the invention's proposed architecture is scalable and can support any foreseen growth with the launch of additional satellites.

Thus, according to a first broad aspect of the invention there is provided a satellite communication system being configured and operable to operate in one or more frequency bands to simultaneously relay data signals between a plurality of remote terminals and one or more ground stations (gateways) in both return and forward links, the satellite communication system comprising a processor configured and operable to receive from each of said remote terminals an uplink return signal in the form of a plurality of terminal return signals spread over predetermined one or more first frequency allocations ("bandwidths") in said one or more frequency bands according to a predetermined spread function, de-spread the received plurality of terminal signals, and generate a downlink return signal, corresponding to at least some of the received plurality of spread terminal return signals and having a predetermined second frequency allocation, to be sent to one of the ground stations.

It should be understood that the terms "frequency allocation" and "bandwidth" used herein relate to/describe an actual interval of spectrum allocated to a given transmission $(f_0,f_1)$ to a bandwidth which relates to the size (spectral size) of that interval $(f_1-f_0)$.

In some embodiments, the second frequency allocation is substantially narrower than a sum of bandwidths of said at least some of the spread terminal return signals.

In some embodiments, the processor communication system is further configured and operable to receive from one of the ground stations an uplink forward signal having a predetermined third frequency allocation, spread the uplink forward signal into a plurality of gateway forward signals spread over at least part of said predetermined first frequency allocation according to a predetermined second spread function, and generate a corresponding plurality of downlink forward signals to be sent to and received by the remote terminal.

The satellite communication system may be configured and operable to operate in one or more of the following frequency bands: Ka, Q, V and W.

The satellite communication system may comprise one or more of the following: an un-furlable reflector antenna for receiving said plurality of terminal return signals, an antenna having a phased-array feeding network, and/or an antenna having a high gain-to-noise-temperature ratio G/T thereby minimizing power and footprint of the remote terminal.

In some embodiments, the spread function is of a higher de-spreading factor than spreading factor of the second spread function.

In some embodiments, the satellite communication system is configured and operable to receive the plurality of terminal return signals and de-spread them into the single uplink return signal, wherein de-spreading factor of the spread function ranges between 100 and 500.

In some embodiments, the processor is configured and operable to receive from the ground station said uplink forward signal and spread the uplink forward signal into the plurality of gateway forward signals, wherein spreading factor of the second spread function ranges between 10 and 50.

In some embodiments, the satellite communication system is configured and operable to simultaneously receive and process uplink return signals from at least 200 remote terminals.

In some embodiments, the bandwidth of the first frequency allocation is in a range of tens of MHz to hundreds of MHz.

In some embodiments, the accumulative bandwidth of the downlink return signals is in a range of tens of MHz to several GHz.

According to another broad aspect of the invention, there is provided a satellite comprising the satellite communication system. The satellite may be a geostationary satellite.

According to yet another broad aspect of the invention, there is provided a remote terminal for use with the satellite communication system of the invention, as described above. The remote terminal may comprise an array of radiating elements configured and operable to generate the plurality of terminal return signals. The remote terminal may have a small size of a few centimeters.

According to yet another broad aspect of the invention, there is provided a method for space-based internet data communication, the method comprising:
  Spreading a return signal, at uplink portion of a return channel, into a plurality of terminal return signals over a predetermined first frequency allocation according to a predetermined spreading factor; and
  De-spreading the terminal return signals to reconstruct said return signal and sending the return signal through downlink portion of the return channel at a predetermined second frequency allocation of which the bandwidth being less than the bandwidth of the first frequency allocation by a predetermined ratio.

In some embodiments, the method further comprises spreading a forward signal, at downlink portion of a forward channel, into a plurality of gateway forward signals over a predetermined third frequency allocation according to a predetermined second spreading factor.

BRIEF DESCRIPTION OF THE DRAWINGS

In order to better understand the subject matter that is disclosed herein and to exemplify how it may be carried out in practice, embodiments will now be described, by way of non-limiting example only, with reference to the accompanying drawings, in which.

DETAILED DESCRIPTION OF EMBODIMENTS

Figure 1:
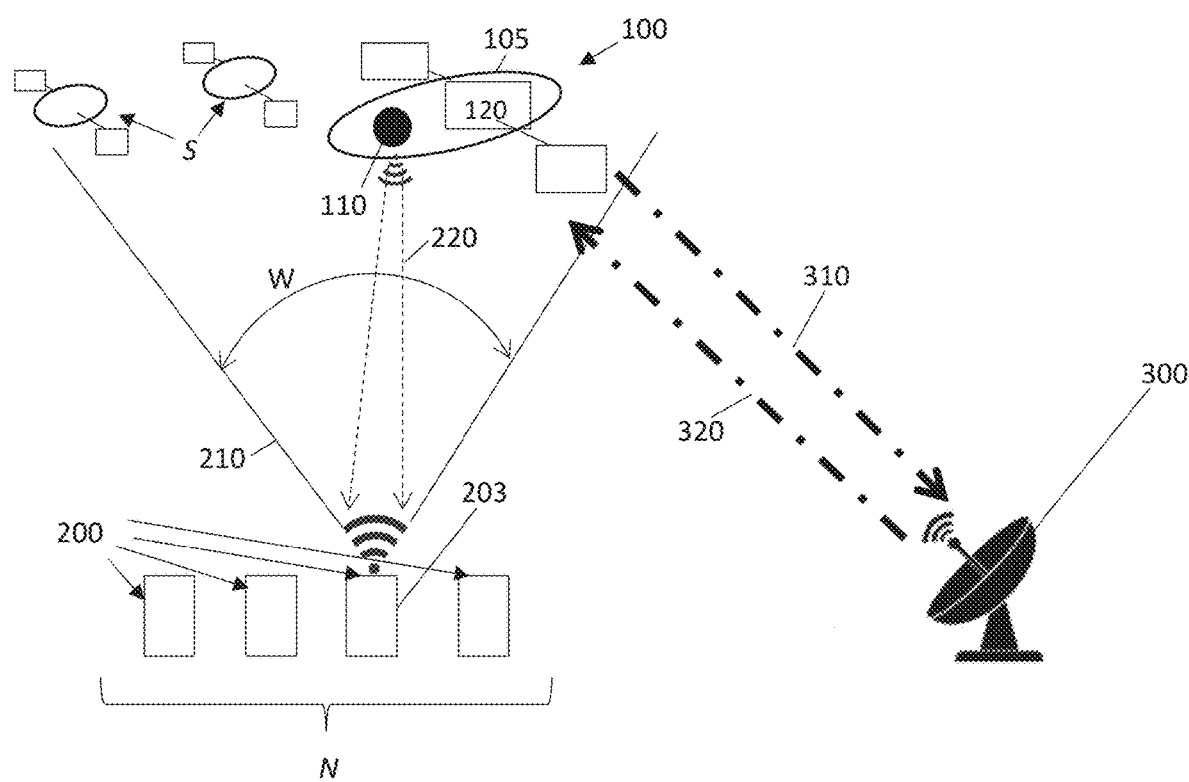
FIG. 1 illustrates a non-limiting embodiment of a space-based internet system utilizing the principles of the present invention.

Reference is made to FIG. 1 which illustrates generally a non-limiting embodiment of the present invention. A satellite communication system 100, for use in space-based internet communication, is provided. The satellite communication system 100 is configured and operable to operate in one or more frequency bands (e.g. Ka, Q, V and W bands), and to simultaneously relay data signals between a plurality N of remote terminals 200 and one or more ground stations (gateway) 300 in both return and forward links. While only one gateway 300 is illustrated, it should be noted that the satellite communication system 100 can be configured to communicate with more than one ground station. However, according to the present invention, as will be further detailed below, a simple ground station is enough to simultaneously support the satellite communication from a large number of remote terminals.

As appreciated, a satellite 105 is provided as one of the components in a space-based communication system. Generally, the satellite communication system 100 is located at least partially within the satellite 105 and interacts with the satellite functional hardware, such as the satellites antenna(s). Apart from the special features described herein, the satellite 105 is a typical satellite configured for space-based internet communication, it includes all the familiar parts of internet communication satellite and therefore need not be described in detail. For example, the satellite includes such parts as antenna(s) 110 for receiving/transmitting electromagnetic signals, motors for mobility and solar panels for energy regeneration.

Further, the general internet data communication principles and parties (terminal, satellite and ground station (gateway)) actions and functions apply for the invention as long as no special features are illustrated and described. Therefore, when regular (known) activity is involved, it may be described briefly while not limiting the inventive features of the invention.

The communication between the satellite 105 and the satellite communication system 100 and a remote terminal 203 is exemplified. In today's arena, it is desired to minimize the size of the terminal remotes and the associated power consumption (both on the remote terminal side as well as on the satellite side). However, it is known that the smaller the terminal the less directional the beam it produces. Less directionality leads to potential interference with adjacent satellites. In the example shown, the terminal 203 generates an electromagnetic beam 210 towards the satellite 105. The electromagnetic beam is referred to herein as an uplink return signal 210. As appreciated, the beam 210 has a width W as it propagates in the space, such that it undesirably arrives also at other adjacent satellites S. According to the invention, in order to minimize the interference to the other satellites S, as well as in order to increase privacy, protect the whole communication data and prevent its detection at other non-addressed satellites, the uplink return signal 210 is spread over a wide bandwidth and is not sent using an electromagnetic beam having a narrow bandwidth. This technique of spectrum-spread is known and practiced in the field. So, instead of irradiating a narrow bandwidth electromagnetic wave with all the data while using large power, the uplink return signal 210 from the terminal to the satellite is partitioned and spread over a wide frequency bandwidth, where portions of the data are sent in different frequency sub-bands. This is also accompanied by lower power usage for each sub-band and by this minimizes/eliminates interference with the other nearby satellites S.

This spreading of the uplink return signal is performed at all of the terminals which may be potentially communicating simultaneously with the satellite. Accordingly, large data sent over a very wide bandwidth is reaching the satellite to be relayed and sent down to the ground station 300. If each terminal sends a signal with a bandwidth of X then for the N terminals communicating simultaneously the bandwidth is XN. In the regular case, the satellite will receive the signals and forward them to the ground station. However, the available ground stations may not be able to support such an overall wide band of frequencies arriving concurrently.

The invention provides a novel processor 120 which is included with the satellite communication system 100. The processor 120 is configured and operable to receive from each of the remote terminals 200 the uplink return signals 210, where each uplink return signal is in the form of a signal spread over a predetermined first frequency allocation according to a predetermined spread function. The processor 120 de-spreads the received plurality of terminal return signals from each remote terminal and reconstructs the respective uplink return signal, then the processor 120 generates a corresponding single downlink return signal, e.g. 310, having a predetermined second frequency allocation to be sent to and received by the ground station 300.

The downlink return signal 310 has a bandwidth which is much narrower than the wide bandwidth of the uplink return signal 210, thereby enabling efficient and cost-effective management, including at the ground station side.

The processor 120 receives the uplink return signal 210, and performs, inter alia, one or more of the following: it demodulates each one of the sub-band signals to retrieve the respective data, reconstructs the original full signal in accordance with a predetermined spread function used by the remote terminal and by the satellite, modulates the original full signal using a narrow bandwidth electromagnetic signal, and generates the downlink return signal 310 to be sent down to the ground station 300.

The ground station receives from the internet data addressed to the remote terminal, e.g. 203, optionally modulates the data and sends it in the forward direction as an uplink forward signal 320, which is received by the satellite communication system 100 and forwarded via a downlink forward signal 220 to the remote terminal 203.

In some embodiments of the invention, the processor 120 is further configured and operable to receive and process the uplink forward signal 320 before it is forwarded down to the remote terminal 203. This step is done in order to minimize interference to other satellites, existing terminals as well as mitigating interference from other satellites to the remote terminals, also in the forward channel. Accordingly, the processor 120 receives from the ground station an uplink forward signal having a predetermined third frequency allocation, spreads the uplink forward signal into a plurality of gateway forward signals spread over at least part of the predetermined first frequency allocation (or another frequency allocation that can be received by the remote terminal), according to a predetermined second spread function, and generates a corresponding plurality of downlink forward signals 220 to be sent to and received by the remote terminal. In some embodiments, the spread function applied on the side of the uplink return channel (from the terminal to the satellite) is of a higher de-spreading factor than spreading factor of the second spread function (on the side of the downlink forward channel, from the satellite to the terminal). For example, the uplink return signal can be spread as high as five hundred, while the downlink forward signal can be spread as high as fifty.

As mentioned above, the trio of the terminal, satellite and gateway can be selected to operate in one or more of the following frequency bands: Ka, Q, V and/or W.

In some embodiments, in order for the satellite communication system 100 to support a large number of terminals simultaneously, the satellite communication system 100 (or the satellite 105) may be equipped with an unfurlable reflector antenna having a wide diameter, such as 3, 5 meters or larger. The antenna of the satellite/satellite communication system may include a phased-array feeding network to support the large number of the connected terminals.

In some embodiments, the satellite is a geostationary satellite. A geostationary satellite is less sensitive to delay and as such may be better suited for IoT services. An adaptation to a LEO constellation can also be done.

In some embodiments, a high/very high satellite G/T can be used, so to minimize the power and footprint of the remote terminals.

A remote terminal that can be used with the satellite communication system 100 may have one or more of the following specifications: the terminal may include an array of radiating elements configured and operable to generate the plurality of terminal return signals, the terminal may have a very small size down to a few centimeters, e.g. four centimeters.

Figure 2:
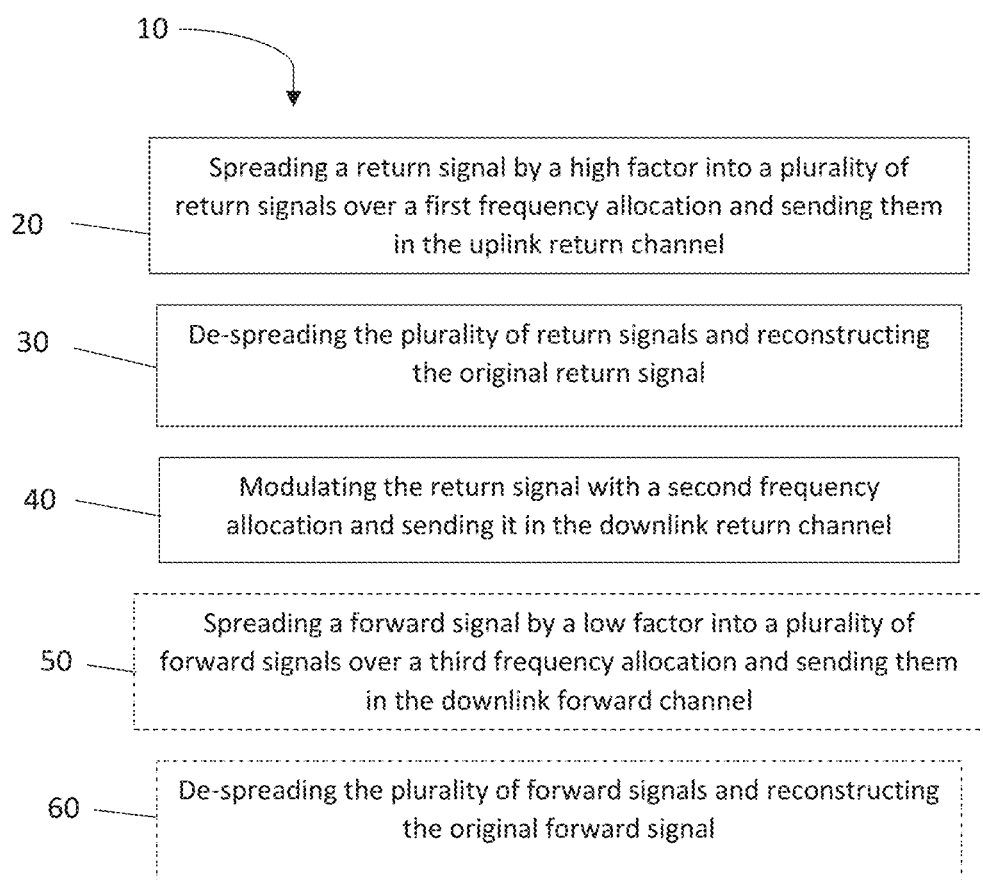
FIG. 2 illustrates a non-limiting embodiment of a space-based internet method utilizing the principles of the present invention.

Reference is made to FIG. 2 illustrating a non-limiting example of a method 10 for space-based internet data communication, according to one embodiment of the invention. The method 10 may be executed by using the processor and satellite of the invention.

In step 20, a return signal is spread by a high factor into a plurality of return signals over a predetermined first bandwidth of the first frequency allocation, according to a predetermined spreading factor, and sent in the uplink return channel.

In step 30, the plurality of return signals are de-spread and the original return signal is reconstructed.

Then, in step 40, the original signal is modulated and sent through downlink portion of the return channel at a predetermined second bandwidth of the second frequency allocation being less than the first bandwidth of the first frequency allocation by a predetermined ratio, thereby enabling elimination of interference at the uplink side while minimizing bandwidth at the downlink side.

The method 10 may further include additional optional steps 50 and 60.

In step 50, a forward signal, arriving at the satellite, is spread by a low factor into a plurality of forward signals over a third bandwidth of the third frequency allocation and sent in the downlink forward channel.

In step 60, the plurality of forward signals are de-spread and the original forward signal is reconstructed.

A non-limiting example for utilizing the invention is described herein below through an experiment and analysis conducted by the inventor.

Design targets were defined, through competitive analysis of existing solutions:
Remote terminal size-<10 cm in diameter (ultra-small aperture terminal, "uSAT")
Remote terminals versions—
  USB Rechargeable WiFi GW+smart phone app for 'WhatsApp-like' text, voice and location messages
  Battery based sensors aggregation device, standalone, BT pairing with mobile device for management
Supporting applications: billing, recharging, metadata collection and analysis, battery status etc.
Ka band
Bit Rates: 1-N×100 Kbps.
The proposed GEO satellite-based solution for IoT:
Multibeam design
  Remote terminal power requirements minimization
  Frequency reuse to maximize capacity/market size
On board processing
  bandwidth savings
    Two orders of magnitude reduction of the number of gateway beams and sites required The following assumptions are used through the rest of this document:
On board antenna size of 5 m in diameter (unfurlable mesh reflector)
31 dB/°K @ Ka band The following are some examples illustrating the uplink budget and interference analysis for the return channel. Table 1 below shows the return channel uplink budget permissible EIRP (effective isotropic radiated power) density (i.e. calculation of antenna uplink EIRP spread over a fixed bandwidth). As shown, the permissible uplink EIRP density does not exceeds the ΔT/T interference criteria of 6% assuming the interfered satellite has a similar G/T.

TABLE 1

| Parameter | Permissible Uplink EIRP Density [dBW/Hz] |
|---|---|
| Uplink EIRP Density [dBW/Hz] | −58.91 |
| Frequency [GHz] | 29.5 |
| Free Space Loss [dB] | 212.91 |
| Interfered Satellite G/T [dB/° K] | 31 |
| Carrier-to-noise ratio $C/N_0$ [dB/Hz] | −12.2 (6%) |

With regard to the performance of the uSAT of the invention with respect to the permissible EIRP density, reference is made to Table 2 below showing the return channel available EIRP and required spreading. More specifically, Table 2 exemplifies the yields of the uSAT of 32 elements of 10 dBm RF power each.

TABLE 2

| EIRP for 32elements [dBW] | $G/T_{@19.5\ GHz}$ [dB/° K] | $Tx\ \varphi_{5\ dB@29.5\ GHz}$ [°] | $Rx\ \varphi_{5\ dB@30\ GHz}$ [°] | EIRP Density $_{@20\ MHz\ Spreading}$ [dBW/Hz] |
|---|---|---|---|---|
| 14.1 | -11.34 | 24.0 | 36.3 | -58.91 |

To maximize both the overall system capacity and the peak bit rate per terminal, there is a need to transmit at maximum power all the time and maximize the information bandwidth to operate at the most power efficient modulation scheme (~0 dB Es/No).

Hence, for a saturated power amplifier at the remote terminal, there is a need to spread each terminal to 20 MHz in order to not exceed the permissible EIRP density. The information rate is adjusted in accordance with the conditions of each remote terminal (location and fading). Under fading conditions, it might be more efficient to reduce the spreading bandwidth of frequency allocation adaptively, however this complicates the design of the system and has negligible gain in capacity. In this connection, reference is made to Table 3 exemplifying return link bit rates relating parameters for clear-sky and fading conditions, each characterized by a beam peak and edge of coverage (EOC) factors. Here, the target value for the energy per bit to noise power spectral density ratio, Es/No, which is a direct indication of the power efficiency of the system, was set according to DVB RCS2, short bursts (536 symbols) at the most efficient modulation scheme QPSK 1/3, +1 dB of margin at Clear-Sky conditions.

TABLE 3

| Parameter | Clear-Sky | | Fading | |
|---|---|---|---|---|
| | Beam Peak | 5 dB EOC | Beam Peak | 5 dB EOC |
| EIRP [dBW] | | 14.1 | | |
| Frequency [GHz] | | 29.5 | | |
| Free Space Loss [dB] | | 212.91 | | |
| Fading Loss [dB] | 0 | | 5 | |
| G/T [dB/° K] | 31 | 26 | 31 | 26 |
| C/N₀ [dB/Hz] | 60.79 | 55.79 | 55.79 | 50.79 |
| Target Es/No [dB][1] | 1.22 | | 0.22 | |
| Symbol Rate [Kbps] | 905.7 | 286.4 | 360.6 | 114.0 |
| Bit Rate [Kbps] | 603.8 | 190.9 | 240.4 | 76.0 |

Table 4 below exemplifies the practical implementation of the supported return link rates.

TABLE 4

| Symbol Rate [Kbps] | Bit Rate [Kbps] | Scenario | Average Bit Rate Clear-Sky Conditions [Kbps] |
|---|---|---|---|
| 50 | 33.3 | Deep Fade (Higher SLA), EOC, GW BW Savings | |
| 100 | 66.7 | | |
| 150 | 100 | | |
| 200 | 133.3 | | |
| 250 | 166.7 | Clear-Sky 4-5 dB contour | For evenly distributed remote terminals averaged up to 5 dB contour in 1 dB increments: 248 |
| 300 | 200 | | |
| 350 | 233.3 | Clear-Sky 3-4 dB contour | |
| 400 | 266.7 | | |
| 450 | 300 | Clear-Sky 2-3 dB contour | |
| 500 | 333.3 | | |
| 550 | 366.7 | Clear-Sky 1-2 dB contour | |
| 600 | 400 | | |
| 650 | 433.3 | | |
| 700 | 466.7 | Clear-Sky 0-1 dB contour | |

For overall system capacity, the average bit rate over all remote terminals is to be estimated. For an even distribution of the terminals on the ground, averaged over the 5 dB contour coverage area with 1 dB increments, an average bit rate of 248 Kbps under clear-sky conditions is achieved.

The following is the example of the downlink budget and interference analysis with regard to the forward channel.

The downlink budget, for a remote terminal with G/T of −11.34 dB/° K using the maximum permissible EIRP density of −3 dBW/Hz (−105 dBW/m²/MHz) yields a C/N in the range of ~0-5 dB (EOC-peak) @ Ka band without any interference (interference free environment). Table 5 below presents the interference-free link budget.

TABLE 5

| Parameter | Clear-Sky | | Fading | |
|---|---|---|---|---|
| | Beam Peak | 5 dB EOC | Beam Peak | 5 dB EOC |
| EIRP Density [dBW] | | −3 | | |
| Frequency [GHz] | | 19.5 | | |
| Free Space Loss [dB] | | 209.37 | | |
| Fading Loss [dB] | 0 | | 5 | |
| G/T [dB/° K] | | −11.34 | | |
| C/N₀ [dB/Hz] | 4.89 | −0.11 | −0.11 | −5.11 |

Considering analysis of a worst-case scenario of interfered environment, an interfering satellite transmitting at the maximum allowable downlink EIRP density is assumed to be located every 3°.

Using the following antenna main beam pattern (main beam gain) approximation:

$$G_{main\ beam}(\varphi) = G_{max} - 12 \cdot \left(\frac{\varphi}{\varphi_{3dB}}\right)^2$$

for a certain aperture size, fixed for the transmitter with a typical spacing of $\lambda/2$ between the antenna elements, a carrier to interference ratio C/I for the worst-case forward down link can be determined as:

$$\frac{C_{peak}}{\sum I_j} = -9.25\ dB$$

Since the worst-case downlink interference is well above the wanted signal, the major portion of the payload power is used to overcome potential interference on the forward downlink.

In practice, the interference is much lower, because there is less satellites interfering, their downlink density is much lower and there is only partial frequency overlap. For half of the interfering satellites at 5 dB lower density than maximum permissible level (which is the realistic forward down link case), the carrier to interference ratio is:

$$\frac{C_{peak}}{\sum I_j} = -1.23\ dB$$

As the required bandwidth on the downlink is two orders of magnitude less than the uplink bandwidth, the system can search for the 'cleanest' bandwidth for the maximum carrier to interference ratio C/I.

The following is the example of the analysis of the worst-case scenario for the forward downlink budget. In order to determine the required spreading of the forward downlink for this worst-case scenario, the carrier to interference-and-noise ratio C/(I+N) is calculated, taking into account the maximum level of interference for a remote terminal at edge of coverage (EOC) under fading conditions.

Table 6 below exemplifies such a worst-case forward link performance.

TABLE 6

| Channel Conditions | C/I $_{EOC}$ [dB] | C/N $_{EOC}$ [dB] | C/(I + N) $_{EOC}$ [dB] |
|---|---|---|---|
| Fading (5 dB) | −14.25 | −5.11 | −14.75 |

To estimate the spreading factor required, a Carrier/Noise Ratio (C/N) of about −1.6 dB for the worst-case scenario is targeted and presented in Table 6. This value −1.6 dB is the required C/N for the most efficient (in terms of power per bit) modulation scheme of the DVB-S2X standard. The modulation scheme has a spectral efficiency of 0.5678 bit/symbol (QPSK 13/45). As the overall C/(I+N) is −14.75 dB, a spreading factor of 13.1 dB is required. A 1:20 spreading is assumed and the resulting C/(I+N) is calculated after dispreading for all the scenarios. Table 7 below exemplifies the worst-case interference case for the forward link performance post de-spreading of 20:1.

To estimate the bit rates for the different channel conditions, a reference bit rate that a remote terminal can receive at the worst-case scenario is specified. If the reference bit rate is set to 1 Kbs, the bit rates for the other scenarios are calculated by adjusting the symbol rates per the margin over the −1.6 dB C/N.

As a factor 13 dB (1:20) of spreading is required with the downlink EIRP density of −3 dBW/Hz, the minimum EIRP required on the satellite for a 1 Kbps worst-case scenario is determined as:

$$EIRP_{minimum} = -3\left[\frac{dBW}{Hz}\right] + 13[dB] + 10 \times \log_{10}\left[\frac{Symbols}{Sec}\right] = 42.45 \text{ dBW}$$

wherein 1760 Symbols/Sec is the symbol rate required for a 1 Kbps at QPSK 13/45; 42.45 dBW through a 5 m reflector at 19.5 GHz require a radiating power of 28 mW.

The minimum bandwidth required on the downlink, for a single terminal operating at 1 Kbps, is determined as:

$$\text{minimum bandwidth} = 1760\left[\frac{Symbols}{Sec}\right] \times 1.2 \times 20 = 42.24 \text{ KHz}$$

where, 1.2 is the roll off factor and 20 is the spreading factor.

TABLE 7

| | C/(I + N) $_{Peak}$[dB] | | | C/(I + N) $_{EOC}$[dB] | | |
|---|---|---|---|---|---|---|
| Channel Conditions | C/I $_{Peak}$[dB] | C/N $_{Peak}$[dB] | C/(I + N) $_{Peak}$[dB] | C/I $_{EOC}$[dB] | C/N $_{EOC}$[dB] | C/(I + N) $_{EOC}$[dB] |
| Clear-Sky | 3.75 | 17.89 | 3.58 | −1.25 | 12.89 | −1.41 |
| Fading (5 dB) | 3.75 | 12.89 | 3.25 | −1.25 | 7.89 | −1.75 |

Table 8 below presents the forward link performance for the more realistic worst-case scenario of 50% of the interfering satellites operating at 5 dB below maximum EIRP density, while maintaining the spreading factor of 1:20.

Table 10 below exemplifies the relative forward link bit rates under clear-sky conditions vs. the minimum service level of 1 Kbps achieved at the worst-case scenario including fading (28 mW RF Power and a Bandwidth of 42.24

TABLE 8

| | C/(I + N) $_{Peak}$[dB] | | | C/(I + N) $_{EOC}$[dB] | | |
|---|---|---|---|---|---|---|
| Channel Conditions | C/I $_{Peak}$[dB] | C/N $_{Peak}$[dB] | C/(I + N) $_{Peak}$[dB] | C/I $_{EOC}$[dB] | C/N $_{EOC}$[dB] | C/(I + N) $_{EOC}$[dB] |
| Clear-Sky | 11.77 | 17.89 | 10.82 | 6.77 | 12.89 | 5.82 |
| Fading (5 dB) | 11.77 | 12.89 | 9.28 | 6.77 | 7.89 | 4.28 |

Table 9 below presents a summary of the forward link performance in different conditions using a spreading factor of 1:20, i.e., summarizes the overall C/(I+N) for all interference conditions.

KHz on the Satellite). The values where calculated based on the results presented in Table 9, where adjustment of the symbol rate was performed to hit the C/N of about −1.6 dB including 1 dB of margin for ASR (Adaptive Symbol Rate):

TABLE 9

| | No Interference | | Worst-Case Interference | | Realistic Interference | |
|---|---|---|---|---|---|---|
| Channel Conditions | C/(I + N) $_{Peak}$[dB] | C/(I + N) $_{EOC}$[dB] | C/(I + N) $_{Peak}$[dB] | C/(I + N) $_{EOC}$[dB] | C/(I + N) $_{Peak}$[dB] | C/(I + N) $_{EOC}$[dB] |
| Clear-Sky | 17.89 | 12.89 | 3.58 | −1.41 | 10.82 | 5.82 |
| Fading (5 dB) | 12.89 | 7.89 | 3.25 | −1.75 | 9.28 | 4.28 |

TABLE 10

| Scenario | No Interference Bit Rate [Kbps] | Worst-Case Interference Bit Rate [Kbps] | Realistic Interference Bit Rate [Kbps] |
|---|---|---|---|
| Clear-Sky 0-1 dB contour | 56.1 | 2.0 | 11.0 |
| Clear-Sky 1-2 dB contour | 44.5 | 1.6 | 8.7 |
| Clear-Sky 2-3 dB contour | 35.4 | 1.3 | 6.9 |
| Clear-Sky 3-4 dB contour | 28.1 | 1 | 5.5 |
| Clear-Sky 4-5 dB contour | 22.3 | 1 | 4.3 |
| Average | 30.5 | 1.1 | 5.9 |

The following is a specific but not limiting example of the configuration and operation of the main functional units involved in the satellite communication system of the invention.

The satellite uses a unfurlable reflector of 5 m diameter. The antenna is fed by a 1000 element phased array, creating 1000 beams on the ground. Out of the 1000 beams, only 200 are active simultaneously. Some of the beams are used to scan the non-active beams coverage.

In the Return Channel, the basic bandwidth unit is built of 20 MHz. An uplink bandwidth allocation of 100 MHz (5×20 MHz) is allocated to each user beam. The same band can probably be used for all beams. Within each 20 MHz channel, only a single remote terminal transmits at a time. The bit rate of each transmission is adapted to meet the channel conditions as presented above in Table 4. The average bit rate per 20 MHz is 248 Kbps. The overall capacity is determined as:

Return Capacity=200×5×248 Kbps=248 Mbps

With regard to the Forward Channel, as presented in Table 10, for a minimum bit rate of 1 Kbps the payload resources required are an RF power of 28 mW and a bandwidth of 42.24 KHz. A reasonable sizing for a small satellite is ~4 W of RF power per beam. For a 4 W power, the bandwidth required per beam is:

$EIRP_{per\ beam}=10 \times \log(4\ [W])+57.96\ [dBi]=64\ dBW$ $Bandwidth_{@4W\ RF\ Power}=42.24\ KHz \times 10^{(64\ [dBW]-42.45\ [dBW])/10} \approx 6\ MHz$ Table 11 below presents the forward link system capacity per beam of 4 W RF power and 6 MHz bandwidth.

TABLE 11

| Scenario | No Interference Bit Rate [Kbps] | Worst-Case Interference Bit Rate [Kbps] | Realistic Interference Bit Rate [Kbps] |
|---|---|---|---|
| Clear-Sky 0-1 dB contour | 7966 | 284 | 1562 |
| Clear-Sky 1-2 dB contour | 6319 | 227 | 1235 |
| Clear-Sky 2-3 dB contour | 5026 | 184 | 979 |
| Clear-Sky 3-4 dB contour | 3990 | 142 | 781 |
| Clear-Sky 4-5 dB contour | 3166 | 142 | 610 |
| Average | 4331 | 156 | 837 |

Table 12 below presents data for forward link supported symbol rates in a practical implementation of a forward link with an RF power of 4 W and Bandwidth of 6 MHz per beam. The symbol rates were capped since they are already impacting the overall allocated bandwidth per beam. At the maximum symbol rate of 1800 Kbps, the bandwidth allocated would have to be ~8 MHz per beam.

TABLE 12

| Symbol Rate[2] [Kbps] | Bit Rate [Kbps] | Scenario | Average Bit Rate @ Clear-Sky Conditions [Kbps] |
|---|---|---|---|
| 50 | 28.4 | Deep Fade (Higher SLA), EOC, GW BW Savings | |
| 100 | 56.8 | | |
| 150 | 85.2 | | |
| 200 | 151.4 | | |
| 250 | 141.9 | Clear-Sky 3-5 dB contour worst case interference | For evenly distributed remote terminals averaged up to 5 dB contour in 1 dB increments (worst-case interference): 156 |
| 300 | 170.3 | Clear-Sky 2-3 dB contour worst case interference | |
| 350 | 198.7 | | |
| 400 | 227.1 | Clear-Sky 1-2 dB contour worst case interference | |
| 450 | 255.5 | | |
| 500 | 283.9 | Clear-Sky 0-1 dB contour worst case interference | |
| 550 | 312.3 | | |
| 600 | 340.7 | | |
| 700 | 397.5 | | |
| 800 | 454.2 | | |
| 900 | 511.0 | | |
| 1000 | 567.8 | Realistic Interference 4-5 dB contour | For evenly distributed remote terminals averaged up to 5 dB contour in 1 dB increments (realistic interference): 767 |
| 1100 | 624.6 | | |
| 1200 | 681.4 | | |
| 1300 | 738.1 | Realistic Interference 3-4 dB contour | |
| 1400 | 794.9 | | |
| 1500 | 851.7 | | |
| 1600 | 908.5 | | |
| 1700 | 965.3 | Realistic Interference 2-3 dB contour | |
| 1800 | 1022.0 | Realistic Interference 0-2 dB contour | |

With regard to the gateway links, the following should be noted. As the satellite supports on-board processing, both uplink and downlink from and to the gateway can operate at low rates. For the 200 active beams configuration, with average bit rates of 5×248 Kbps per beam for the return channel, a bandwidth a 50 MHz is sufficient as the link can use the highest DVB S2X modulation scheme. For a similar capacity on the forward link, 50 MHz should be sufficient as well. A single and simple gateway can support this satellite as well as future expansion. To support this basic configuration without on board processing, a bandwidth of 20 GHz on the downlink would be required. Such amount of bandwidth would require a minimum of 3 gateway beams using all the Ka spectrum. It is obvious that since 3 gateways are required for this basic configuration, any expansion would require more gateways, which increase the cost significantly.

In this example, the power required only for the forward channel downlink is calculated, as this is the main power consuming section of the payload. As described above, a 6 MHz channel transmitting at maximum EILRP density of −3 dBW/Hz will be used per active beam. This EIRP density represents a power of 4 W RF power per active beam using a 5 m reflector. Assuming a DC power of 10 W per beam, ~2000 W of power for the forward link is required. This power is very low in terms of geostationary satellites. Typical values are in the range of 8-20 KW. A low power satellite will have a major impact on the cost as most of the bus components are designed for power, such as solar array and battery.

The overall minimum capacity that can be generated from the above exemplified system design is as follows:

Return link—200×5×248 Kbps=248 Mbps; and

Forward link—200×156 Kbps=31.2 Mbps for the worst-case interference, and 200×767 Kbps=153 Mbps for the more realistic scenario.

The overall capacity for the realistic scenario is 401 Mbps. Each 1 Mbps can generate 324 GB per month at 100% utilization. For 401 Mps at full utilization, 129.924 TB of data can be generated per month.

Thus, the invention provides a disruptive approach for space based IoT service architecture. This architecture introduces a new class of IoT terminals never seen before. A device as small as 4 cm in diameter is sufficient to establish a link with a geostationary satellite enabling low cost devices and services with global coverage.

The novel architecture of the present invention provides for use of a geostationary satellite deploying a big unfurlable reflector (e.g. ~5 m) with a phased array feeding network. where each satellite generates ~1000 beams on the ground while only ~200 beams are active simultaneously. The remote terminal may for example be built from 32 radiating elements of 10 dBm each. The signal transmitted by the remote terminal is being spread by factor of up to 400 (26 dB) to eliminate interference to adjacent satellites. On board processing de-spreads the signals to minimize the bandwidth required for gateways links, reducing costs considerably. This type of satellites requires very little power which supports a cost-effective design. The proposed architecture is scalable and can support any foreseen growth.

The invention claimed is:

1. A satellite communication system being configured and operable to operate in one or more frequency bands to simultaneously relay data signals between a plurality of remote terminals and one or more ground stations (gateways) in both return and forward links, the satellite communication system comprising a processor configured and operable to receive from each of said remote terminals an uplink return signal in the form of a plurality of terminal return signals spread over a predetermined first frequency allocation in said one or more frequency bands according to a predetermined spread function, de-spread the received plurality of terminal return signals, and generate a downlink return signal, corresponding to at least some of the received plurality of spread terminal return signals and having a predetermined second frequency allocation, to be sent to one of the ground stations, wherein said processor is further configured and operable to receive from one of the ground stations an uplink forward signal having a predetermined third frequency allocation, spread the uplink forward signal into a plurality of gateway forward signals spread over at least part of said predetermined first frequency allocation according to a predetermined second spread function, and generate a corresponding plurality of downlink forward signals to be sent to and received by the remote terminal.

2. The satellite communication system according to claim 1, wherein a bandwidth of said second frequency allocation is narrower than a sum of bandwidths of said at least some of the spread terminal return signals.

3. The satellite communication system according to claim 2, wherein said processor is configured and operable to receive from the ground station said uplink forward signal and spread the uplink forward signal into the plurality of gateway forward signals, wherein spreading factor of said second spread function ranges between 10 and 50.

4. The satellite communication system according to claim 3, wherein accumulative bandwidth of said downlink return signals is in a range of tens of MHz to several GHz.

5. The satellite communication system according to claim 1 being configured and operable to operate in one or more of the following frequency bands: Ka, Q, V and W.

6. The satellite communication system according to claim 1, comprising an un-furlable reflector antenna for receiving said plurality of terminal return signals.

7. The satellite communication system according to claim 1, comprising an antenna having a phased-array feeding network.

8. The satellite communication system according to claim 1 having a high G/T thereby minimizing power and footprint of the remote terminal.

9. The satellite communication system according to claim 1, wherein said spread function is of a higher de-spreading factor than spreading factor of said second spread function.

10. The satellite communication system according to claim 1, wherein said processor is configured and operable to receive said plurality of terminal return signals and de-spread them into said single uplink return signal, wherein de-spreading factor of said spread function ranges between 100 and 500.

11. The satellite communication system according to claim 1, being configured and operable to simultaneously receive and process uplink return signals from at least 200 remote terminals.

12. The satellite communication system according to claim 1, wherein the bandwidth of said first frequency allocation is in a range of tens of MHz to hundreds of MHz.

13. A satellite for use in space-based communication, comprising the satellite communication system of claim 1.

14. The satellite according to claim 13, being a geostationary satellite.

15. The remote terminal according to claim 14, wherein at least one of the following:
   the remote terminal comprises an array of radiating elements configured and operable to generate said plurality of terminal return signals;
   the remote terminal having a size of a few centimeters.

16. A remote terminal for use with the satellite communication system of claim 1.

17. A method for space-based internet data communication, comprising:
   spreading a return signal, at uplink portion of a return channel, into a plurality of terminal return signals over a predetermined first frequency allocation according to a predetermined spreading factor; and
   de-spreading the terminal return signals to reconstruct said return signal and sending the return signal through downlink portion of the return channel at a predetermined second frequency allocation a bandwidth of which being less than a bandwidth of said first frequency allocation by a predetermined ratio,
   receiving from one of the ground stations an uplink forward signal having a predetermined third frequency allocation,
   spreading the uplink forward signal into a plurality of gateway forward signals spread over at least part of said predetermined first frequency allocation according to a predetermined second spread function, and
   generating a corresponding plurality of downlink forward signals to be sent to and received by the remote terminal.

18. The method according to claim 17, further comprising spreading a forward signal, at downlink portion of a forward channel, into a plurality of gateway forward signals over a predetermined third frequency allocation according to a predetermined second spreading factor.

19. The method according to claim 17, wherein at least one of the following:
   said spreading factor is between 100 and 500;
   said second spreading factor is between 10 and 50.

* * * * *